United States Patent Office 3,510,408
Patented May 5, 1970

3,510,408
PROCESS FOR PRODUCING HIGH SURFACE AREA NICKEL POWDER
James P. Murdock, West Allis, and Dirk Pouli, Milwaukee, Wis., assignors to Allis-Chalmers Manufacturing Company, Milwaukee, Wis.
No Drawing. Filed Nov. 14, 1967, Ser. No. 682,992
Int. Cl. C22d 1/14, 5/00
U.S. Cl. 204—10                        10 Claims

ABSTRACT OF THE DISCLOSURE

An electrochemical process for producing nickel powders having a surface area in excess of 10 m.$^2$/gm. utilizing an aqueous electrolyte of ammonium hydroxide with a dissolved nickel salt and effecting an excessively high initial cathode current density of from 10,000 to 100,000 amps/dm.$^2$.

BACKGROUND OF THE INVENTION

This invention relates generally to a process for producing nickel powders. More specifically, this invention relates to an electrolytic process for producing finely divided nickel powders having an extremly large surface area of from 10 to 18 m.$^2$/gm.

Although nickel powders were originally produced primarily by pyrometallurgical processes from nickel carbonyl, some commercial developments have been made in the past for producing nickel powder electrolytically. For example, the well known Mantell Process, described in U.S. 2,233,103 and the Mayper Process described in U.S. 2,625,507 are quick, reliable and inexpensive electrolytic processes for producing nickel powders which are readily adaptable to either laboratory or commercial operations.

Although the nickel powders as produced by the Mantell and Mayper Processes are perfectly suited for many applications, they are suitable only to a very limited extent in applications where large surface areas are desirable, as for example, in the fuel cell and related arts. That is to say, the Mantell and Mayper Processes are capable of producing nickel powders having surface areas up to about 0.7 m.$^2$/gm., which is rather substantial by some prior art standards. Accordingly, these powders could be used to manufacture electrodes for fuel cells. The characteristics of such a fuel cell, however, are greatly enhanced if the surface of the nickel electrode is enhanced. This can most easily be achieved by fabricating the electrode from nickel powders having substantially larger surface areas.

In more recent advancements, new electrolytic processes have been developed which are capable of producing nickel powders having surface areas in excess of about 3 m.$^2$/gm. The fabrication of fuel cell electrodes from these powders has done much to enhance the electrical characteristics of such fuel cells. It is obvious however, that the fuel cell characteristics could be optimized even further if nickel powders of even higher surface area were available.

This invention is predicated upon our discovery of a new high current density, electrolytic process for producing nickel powders wherein surface areas of from 10 to 18 m.$^2$/gm. can be readily obtained.

Accordingly, it is a primary object of this invention to provide an electrolytic process for producing finely divided nickel powders having surface areas of from 10 to 18 m.$^2$/gm.

It is another primary object of this invention to provide a new and improved nickel electrode of extremely high surface area for use in fuel cells and other electrochemical cells.

These and other objects and advantages are fulfilled by this invention as will become apparent from a full understanding of the following detailed description.

DESCRIPTION OF THE PREFERRED EMBODIMENTS

In a more elementary embodiment, the electrolytic process of this invention utilizes an electrolyte comprising an aqueous solution of ammonium hydroxide containing nickel ions in the +2 valence state. The concentration of the ammonium hydroxide should be in excess of 150 ml. of 29 percent NH$_4$OH per liter of electrolyte. Although there is no single definable upper limit for the concentration of ammonium hydroxide, the practical upper limit is preferably within a range of from 150 to 350 ml./liter (29 percent) and ideally should be at about 250 ml./liter. Within this preferred concentration range, the alkalinity of the electrolyte will be from pH 10.5 to pH 12. Concentrations below 150 ml./liter should be avoided since nickel hydroxide may precipitate if the alkalinity falls much below pH 10. Concentrations above 350 ml./liter are detrimental in that excessive ammonia losses may be experienced due to volatilization.

The source of nickel in the electrolyte may be any soluble nickel salt or compound compatible with the ammonium hydroxide. Any soluble nickel salt will suffice which yields Ni$^{++}$ ions and which has an anion that does not interfere with the reduction reaction. Although some nickel salts are more suitable than others, we have found that, with the exception of nickel nitrate, any soluble nickel salt yielding Ni$^{++}$ ions will work. Hence, any nonnitrate, soluble nickel salt yielding a Ni$^{++}$ ion will suffice. The salts we have found particularly suitable are nickel sulfate, nickel sulfamate, nickel acetate, and to a more limited extent nickel chloride. The only disadvantage in using nickel chloride is that this salt tends to yield a somewhat coarser nickel particle having a surface area limited at about 10 m.$^2$/gm. Therefore, if such coarser particles are desired, the use of nickel chloride may be preferred. The concentration of the nickel salt must be sufficient to provide from 1 to 6 grams of Ni$^{++}$ per liter of electrolyte. The optimum concentration appears to be at about 3.0 gm./liter. At concentrations exceeding 3 gm./liter, proportionally higher cell current will be necessary and lower surface area particles may be produced.

The cell electrode may be of any electrically conductive metal which is reasonably stable in the electrolyte. Although we have preferred to use a platinum anode and nickel cathode, other conductive metals will suffice provided they do not corrode in the electrolyte.

The geometric configuration of the electrodes is really more important than their composition, and should be physically designed to permit a high initial cathode current density, namely, from 10,000 to 100,000 amps/dm.$^2$, at reasonable current efficiencies. This is most readily done by providing a cathode surface area substantially smaller than the anode surface area each within a relatively large volume of electrolyte. To this end, we have preferred to use 12 liter bath containing a single nickel wire for the cathode, and a tubular shaped anode of platinum gauze placed concentrically about the wire cathode. Gauze or screen is preferred for such an anode because it provides a sufficiently large surface area and permits circulation of the electrolyte therethrough.

The spacing between anode and cathode should be maintained as close as practical because closer spacings will result in higher voltage efficiencies. However, because nickel is being deposited upon the cathode, the spacing cannot be so close as will cause the deposit to bridge between the two electrodes and thus short circuit the cell. Therefore, we have preferred to use a spacing of at least 0.5 cm., but no more than 1.5 cm.

In operation, the cell as described above is connected to a direct current electrical power source and sufficient current is supplied to produce an initial cathode current density of from 10,000 to 100,000 amps/dm.$^2$ (about 1,000 to 10,000 amps/ft.$^2$). It is, of course, obvious that the deposition of nickel powder onto the cathode will increase the surface area thereof, and accordingly cause a continuing decrease in the cathode current density. It is preferable, therefore, that the starting cathode current density, calculated with respect to the starting cathode surface area, be set at about the upper limit, namely, 100,000 amps/dm.$^2$.

For the basic embodiment as described above, the cell temperature during operation is preferably maintained within a range of from 50 to 70° C. At temperatures much below this range, the nickel deposit will not adhere to the cathode and the particle surface area will be substantially reduced. At temperatures above the preferred range, ammonia loss by volatilization may become excessive resulting in the precipitation of nickel hydroxide, as mentioned above. We have found that by using a 20 cm. length of 0.154 cm. diameter cathode with a 64 cm.$^2$ anode, as described above, the temperature of the cell will be self-sustaining at 60° C. if a 12 liter bath is used. Large electrode surface areas will require proportionally larger baths if the temperature is to be self-sustaining.

Although agitation is not absolutely necessary, we have found that mild mechanical stirring will not interfere with the deposition and will actually aid the process by circulating electrolyte between the electrodes.

If the cell is started and operated as described above, nickel powder will immediately commence to deposit on the cathode as oxygen gas is evolved at the anode. The cell will then continue to operate nicely for a period only of about 3 to 4 minutes. This limited effective time is due to the fact that the cathode surface area is being continually increased and accordingly, the cathode current density is continually decreasing, as described above. Therefore, during operation of the cell, it is necessary to clean the deposited nickel from the cathode at regular intervals so that the cathode current density does not drop to inoperative levels. If the cell is operated as described above, we find it preferable to clean the cathode at about 3 minute intervals. Although practically any method for cleaning or removing the nickel from the cathode will obviously suffice, we prefer to merely knock the deposit to the bottom of the reaction vessel for subsequent recovery. This is most easily done by merely touching the cathode with a vibrating probe. In this way, a minimum amount of time is lost, and at the end of the operation, the nickel powders are concentrated at the bottom of the reaction vessel for easy recovery.

Using the ideal parameters as described above, the cell may be operated efficiently for a total period of about 2 hours, at which time about 75 percent of the Ni$^{++}$ is depleted. This, of course, does not include the time spent cleaning the cathode. If the cell is operated substantially beyond the 2 hour period, or beyond a 75 percent Ni$^{++}$ depletion, even higher surface area powders can be obtained, namely, surface areas exceeding 18 m.$^2$/gm. However, the yield with respect to time and accordingly the efficiency will fall off sharply.

As should be obvious from the above discussion, the powder surface area is dependent upon the concentration of Ni$^{++}$ in the bath. Hence, as the Ni$^{++}$ concentration is decreased, the surface area of the deposited powder is increased. Therefore, if powders having surface area in excess of 18 m.$^2$/gm. are desired, such powders can be produced by operating the above cell with less than about 1.5 gm./liter of Ni. As noted previously however, the efficiency and yield will be greatly reduced. We have further learned that powder surface area is also dependent upon cathode current density and hence powders having surface areas in excess of 18 m.$^2$/gm. can readily be produced at cathode current densities exceeding 100,000 amps/dm.$^2$. Since this does not substantially affect the yield and efficiency, this latter technique is recommended if powders exceeding 18 m.$^2$/gm. are sought.

For the basic embodiment as described above, current efficiencies of about 30 percent are normally realized. We have found that current efficiencies can be boosted to about 60 percent if ammonium bicarbonate is added to the electrolyte. If ammonium bicarbonate is used, then the amount of ammonium hydroxide in the electrolyte can be reduced proportionally. It should be understood however, that ammonium bicarbonate cannot be completely substituted for the ammonium hydroxide. The relative amounts of each compound we have found to be ideal is about 20 gm./liter ammonium bicarbonate and 50 ml./liter ammonium hydroxide (29 percent). Although we do not know with certainty why the ammonium bicarbonate is helpful, we do believe it results from the fact that ammonium bicarbonate is more completely ionized than is the ammonium hydroxide.

To aid in a better understanding of this invention, the following examples are given to illustrate typical parameters in two actual practices of this invention. These examples are meant only to be exemplary and should in no way limit the scope of this invention.

EXAMPLE I

An electrolysis cell was constructed having a cathode consisting of a single nickel wire, 0.060 inch in diameter and 8 inches in length; and an anode consisting of a piece of 40 mesh platinum gauze rolled into a tubular shape 8 inches in length and 1 inch in diameter. The anode comprising about 25 square inches of surface area, was disposed concentrically about the wire cathode.

Twelve liters of distilled water were poured into a container. To this was added 164.0 grams of nickel sulfate, $NiSO_4 \cdot 6H_2O$. When the nickel was completely dissolved, 3,000 cubic centimeters (250 cubic centimeters per liter) of 29 percent ammonium hydroxide, $NH_4OH$, were added. This caused the solution to turn from a clear green to a clear royal blue. The solution was stirred vigorously during these additions. The pH was measured at 11.5 to 12.0. The electrodes were then immersed into the solution and the bath electrolyzed. A current density of 10,000 ASF was established, based upon the original cathode surface area. After 3 minutes, the current was shut off and a vibrating probe touched to the cathode wire knocking the deposit to the bottom of the container. This 3 minute procedure was continued for a period of 2½ hours. 600 cubic centimeters (50 cubic centimeters per liter) of 29 percent $NH_4OH$ were added after every hour of operation. From this experiment, 18.67 grams of powder were produced having a surface area of 18 m.$^2$/gm.

EXAMPLE II

The same procedure as in Example I was followed except that 240 grams of nickel sulfamate were used instead of the nickel sulfate. This experiment produced 21.3 grams of powder having a surface area of 18.0 m.$^2$/gm.

The embodiments of the invention in which an exclusive property or privilege is claimed are defined as follows:

1. A method of producing finely divided nickel powders having a surface area in excess of 10 square meters per gram which comprises: providing an electrolyte comprising an aqueous solution of ammonium hydroxide at a concentration in excess of 150 milliliters of 29 percent ammonium hydroxide per liter of electrolyte and a dissolved nonnitrate nickel salt yielding Ni$^{++}$ ions in such quantity as will yield from 1 to 6 grams of Ni$^{++}$ per liter of electrolyte, immersing at least one metallic cathode and one metallic anode into said electrolyte; connecting said cathode and said anode to a direct current electrical power source, applying sufficient current across said anode and cathode as will produce an initial cathode current density of from 10,000 to 100,000 amperers per square decimeter causing nickel powder to be deposited onto said cathode; and removing the nickel powder from said cathode.

2. The method of claim 1 wherein said electrolyte is maintained at a temperature of from 50 to 70° C.

3. The method of claim 1 wherein said dissolved nickel salt is provided in sufficient quantity as will yield 3 grams of $Ni^{++}$ per liter of electrolyte.

4. The method of claim 1 wherein said 29 percent ammonium hydroxide is provided in a quantity of about 250 milliliters per liter of electrolyte.

5. The method of claim 1 wherein said nickel salt is selected from the group consisting of nickel sulfate, nickel sulfamate, nickel acetate and nickel chloride.

6. The method of claim 1 wherein said metallic cathode comprises a single strand of wire and said metallic anode comprises a cylindrically formed screen placed concentrically about said single strand of wire.

7. The method of claim 1 wherein said metallic anode and said metallic cathode are spaced apart by a distance of from 0.5 to 1.5 centimeters.

8. The method of claim 1 wherein the electrolyte contains about 50 milliliters of 29 percent ammonium hydroxide per liter of electrolyte and about 20 grams of ammonium bicarbonate per liter of electrolyte.

9. The method of claim 1 wherein the nickel powder deposited on said metallic cathode is removed therefrom at intervals of about 3 to 4 minutes.

10. The method of claim 1 wherein nickel powders having surface areas in excess of 18 square meters per gram are produced by providing only sufficient dissolved nickel salt as will yield less than about 1.5 grams of $Ni^{++}$ per liter of electrolyte.

References Cited

UNITED STATES PATENTS

| 2,233,103 | 2/1941 | Mantell | 204—10 |
| 2,625,507 | 1/1953 | Mayper | 204—10 |
| 3,458,407 | 7/1969 | Wrangell | 204—10 |

FOREIGN PATENTS 508,160  12/1954  Canada.

JOHN H. MACK, Primary Examiner

T. TUFARIELLO, Assistant Examiner

U.S. Cl. X.R.

204—112